No. 611,318. Patented Sept. 27, 1898.
E. P. HERPIN.
DEVICE FOR CONVERTING MOTION.
(Application filed June 11, 1898.)
(No Model.)
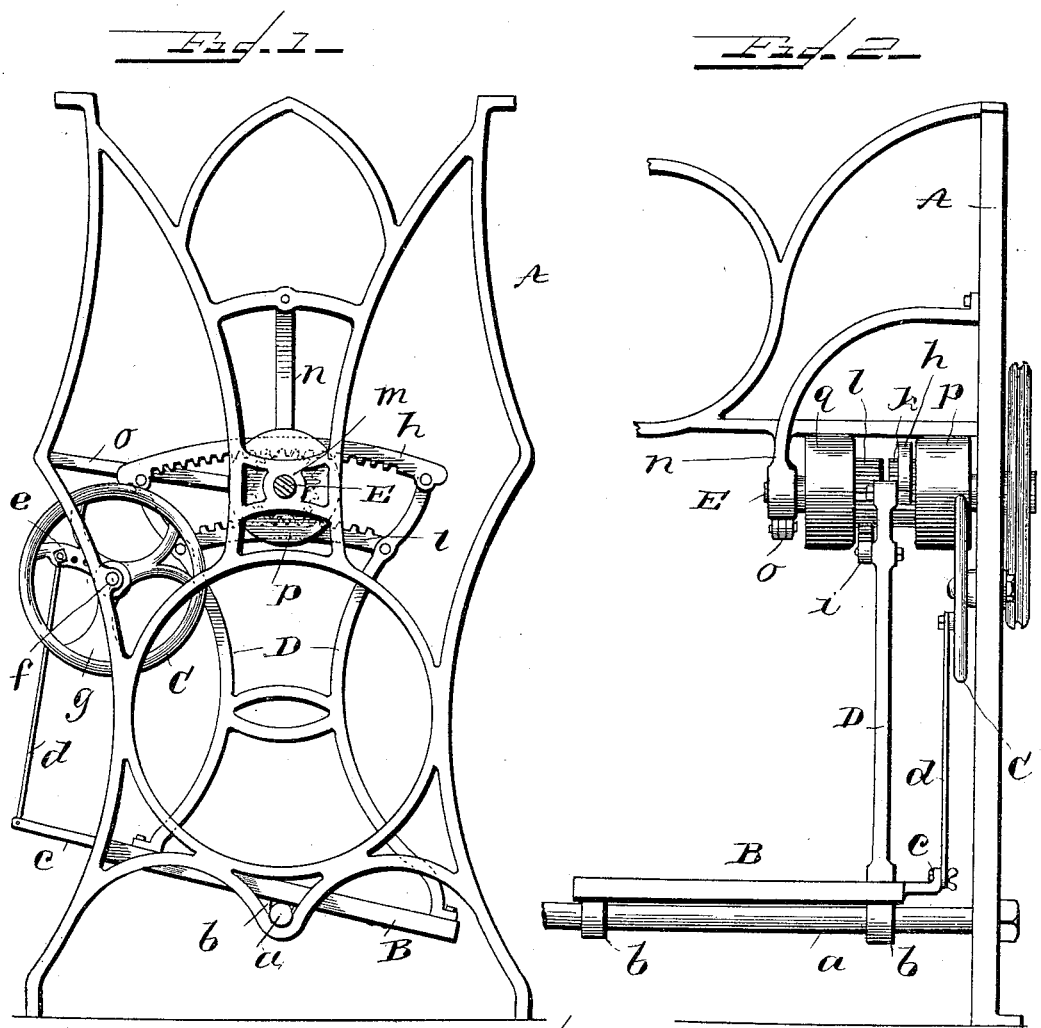
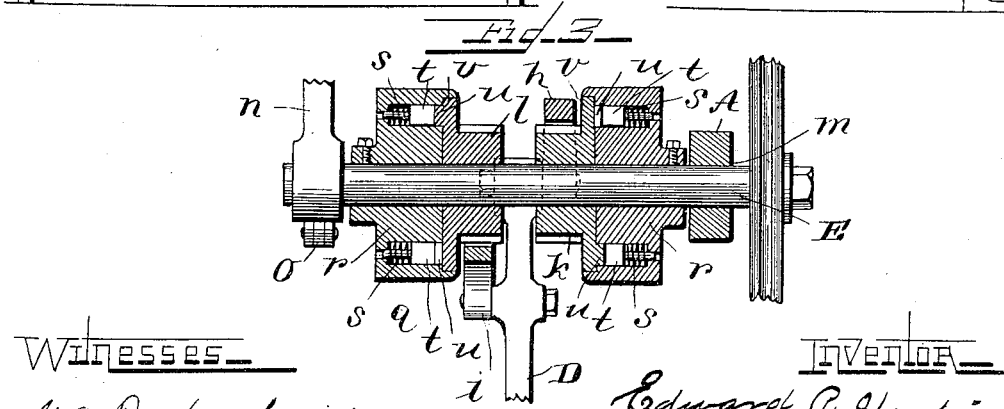
Witnesses
G. A. Pauberschmidt,
N. Parker Reinohl.
Inventor
Edward P. Herpin
By D. L. Reinohl
Attorney.

UNITED STATES PATENT OFFICE.

EDWARD P. HERPIN, OF BALTIMORE, MARYLAND.

DEVICE FOR CONVERTING MOTION.

SPECIFICATION forming part of Letters Patent No. 611,318, dated September 27, 1898.

Application filed June 11, 1898. Serial No. 683,163. (No model.)

*To all whom it may concern:*

Be it known that I, EDWARD P. HERPIN, a citizen of the United States, residing at Baltimore, in the State of Maryland, have invented certain new and useful Improvements in Devices for Converting Motion; and I do hereby declare the following to be a full, clear, and exact description of the invention, such as will enable others skilled in the art to which it appertains to make and use the same.

My present invention relates to devices for converting motion especially designed for use in connection with sewing-machines and other machines driven by foot-power applied to a treadle, has for its object the production of a light-running propelling mechanism, and consists in certain improvements in construction, which will be fully disclosed in the following specification and claims.

In the accompanying drawings, which form part of this specification, Figure 1 represents a side elevation of a sewing-machine frame with my improved mechanism attached thereto; Fig. 2, a rear elevation of the same, and Fig. 3 a vertical longitudinal section of the power-shaft with the pinions and clutches thereon on an enlarged scale.

Reference being had to the drawings and the letters thereon, A indicates the frame of a sewing-machine, to the rod $a$ of which the treadle B is pivotally connected by the usual straps or loops $b\ b$. The treadle is provided with an arm $c$, to which is attached the lower end of a rod $d$, and the upper end thereof is connected eccentrically to an arm $e$ of a revoluble regulator or balance-wheel C and is adjustable thereon to regulate the stroke of the treadle and the rack-bars, as will hereinafter more fully appear. The regulator C is attached to the frame A in any preferred position, as at $f$, to revolve freely and store momentum from the treadle, and the wheel is preferably counterbalanced, as at $g$, to prevent its stopping on dead-center.

Attached to and rising from the treadle is a supplemental frame D, supporting rack-bar $h$ at its upper end and on one side of the frame and rack-bar $i$ in a plane parallel with the bar $h$, but attached to the opposite side of the frame D, so that the rack-bars are in different vertical planes. The rack-bars are curved and the teeth of the bars are on adjacent edges, those of the upper bar $h$ being on the under side of the bar and those of the bar $i$ on the upper side of the bar.

On the power-shaft E are pinions $k\ l$, loosely mounted thereon, and the shaft is supported at its outer end in the frame A, as at $m$, and at its inner end in a hanger $n$, which is held rigid by a brace $o$. In the oscillatory motion of the frame D imparted by the treadle B the upper rack-bar engages the pinion $k$ and the lower rack-bar engages the pinion $l$. Each of the pinions $k\ l$ is engaged by a clutch $p\ q$, secured to the shaft E, which operate to permit the pinions to rotate in one direction loosely without rotating the shaft E, and in the opposite direction motion is imparted from the pinions to the shaft. Each of the clutches comprises a head $r$, fixed to the shaft E and having a series of openings $s$ therein, with spring-actuated dogs $t$ in the same. The parts are so arranged that the shaft E will always have the same plane of rotation when the treadle is operated to actuate the rack-bars. When the treadle is vibrated by the foot of the operator, its motion is communicated through the frame D to the rack-bars $h\ i$, and the rack-bar $h$ rotates pinion $k$ and through the clutch mechanism in connection therewith has its rotation imparted to the shaft E. During this movement of the rack-bar $h$ the rack-bar $i$ also engages the pinion $l$, which runs loosely on the shaft through the arrangement of its clutch, which is reverse to the clutch in connection with pinion $k$; but on the return stroke or movement of the rack-bar $h$ the pinion $k$ runs loose on the shaft E, and the pinion $l$ imparts its motion to said shaft from rack-bar $i$ in the same plane of rotation as that imparted by pinion $k$.

During the operation of the treadle B the regulator or balance-wheel C is continuously rotated and prevents the ends of the rack-bars from running too close to the pinions, which would cause the ends of the race formed by said bars and the frame which supports them to strike the pinions and seriously jar or break the mechanism. The regulator by the adjustment of the rod $d$ permits the treadle to rise and fall to a predetermined point, thereby affording ease and comfort to the operator, and will regulate its vibration, so as to terminate the stroke of the rack-bars either forward or backward in advance of the ends of the race in which the pinions travel. The regulator is especially beneficial in slowing or stopping the machine. If the frame D were alone used with the treadle, the only means for preventing the frame striking the pinions would be the foot or feet of the operator on the treadle, and this could not be relied upon because of the irregularity of movement and the inconvenience arising from the continual care which would be required to produce uniform length of stroke to the treadle.

The device can be applied to other machines with equal facility, and wherever a treadle is used a regularity of rotation of the driving-shaft will ensue and dead-centers be overcome.

It is apparent that many minor changes in the details of construction and arrangement of the several parts may be made without departing from the spirit of the invention.

Having thus fully described my invention, what I claim is—

1. In a device for converting motion, a frame, a treadle pivoted thereto, a pair of rack-bars mounted on the treadle, a shaft, and pinions engaging said rack-bars, in combination with a revoluble regulator connected to the treadle.

2. In a device for converting motion, a frame, a treadle pivoted thereto, a pair of rack-bars mounted on the treadle, a shaft, and pinions engaging said rack-bars, in combination with a revoluble regulator connected to the treadle and provided with means for varying the stroke of the treadle and the rack-bars.

3. In a device for converting motion, a frame, a treadle pivoted thereto, a supplemental frame mounted on the frame, a pair of rack-bars secured to said frame in different vertical planes, a shaft, and pinions engaging each rack-bar, in combination with a ratchet for each pinion.

4. In a device for converting motion, the combination of a frame, a treadle pivoted thereto, a supplemental frame mounted on the treadle and having rack-bars thereon in parallel planes, a shaft having pinions thereon, the said rack-bars respectively extending over one pinion and under the other, and a revoluble regulator connected to and operated by the treadle.

In testimony whereof I affix my signature in presence of two witnesses.

EDWARD P. HERPIN.

Witnesses:
JASPER M. BERRY, Jr.,
JASPER M. BERRY.